(12) United States Patent
Livingston

(10) Patent No.: US 10,014,748 B2
(45) Date of Patent: Jul. 3, 2018

(54) COAXIAL DIRECT DRIVE SYSTEM HAVING AT LEAST TWO PRIMER MOVERS LINEARLY MOVEABLE ALONG A DRIVE SUPPORT MEMBER

(71) Applicant: Edward Livingston, Waterloo (CA)

(72) Inventor: Edward Livingston, Waterloo (CA)

( * ) Notice: Subject to any disclaimer, the term of this patent is extended or adjusted under 35 U.S.C. 154(b) by 4 days.

(21) Appl. No.: 14/517,908

(22) Filed: Oct. 19, 2014

(65) Prior Publication Data

US 2015/0108864 A1    Apr. 23, 2015

Related U.S. Application Data

(60) Provisional application No. 61/894,371, filed on Oct. 22, 2013.

(51) Int. Cl.
| | |
|---|---|
| *H02K 7/14* | (2006.01) |
| *B63H 5/10* | (2006.01) |
| *B63G 8/08* | (2006.01) |
| *B63H 21/17* | (2006.01) |
| *F42B 19/24* | (2006.01) |

(Continued)

(52) U.S. Cl.
CPC ............... *H02K 7/14* (2013.01); *B63G 8/08* (2013.01); *B63H 1/14* (2013.01); *B63H 5/10* (2013.01); *B63H 21/17* (2013.01); *B64D 27/24* (2013.01); *B64D 35/06* (2013.01); *F42B 19/24* (2013.01); *H02K 16/00* (2013.01); *Y02T 50/62* (2013.01)

(58) Field of Classification Search
CPC . H02K 7/14; H02K 16/00; H02K 7/12; B64D 35/06; B64D 27/24; B63G 8/08; B63H 1/14; B63H 1/02; B63H 5/10; B63H 21/17; B64C 27/10; B64C 27/16; B64C 2027/8227; F42B 19/24
USPC .......... 310/112, 114, 80, 75 R, 12.14, 12.26, 310/12.15, 113; 416/128, 157 B, 134 A, 416/140, 150; 244/17.23, 17.25, 62, 71, 244/69; 415/1, 60, 68
See application file for complete search history.

(56) References Cited

U.S. PATENT DOCUMENTS

| | | | | |
|---|---|---|---|---|
| 4,701,691 A | * | 10/1987 | Nickoladze | H02K 19/26 310/112 |
| 5,229,677 A | * | 7/1993 | Dade | H02K 5/173 310/112 |

(Continued)

FOREIGN PATENT DOCUMENTS

| | | | | | |
|---|---|---|---|---|---|
| GB | 2465284 | * | 5/2010 | | |
| GB | 2465284 A | * | 5/2010 | ............. | H02K 16/00 |

*Primary Examiner* — Bernard Rojas
*Assistant Examiner* — Maged Almawri
(74) *Attorney, Agent, or Firm* — Perry + Currier

(57) ABSTRACT

A coaxial direct drive system includes at least two prime movers mounted to a motor carrier member about a common axis. Each prime mover includes a stator affixed to the motor carrier member, and each prime mover further includes a rotor which can rotate about the common axis. Each rotor has a driven member affixed to it, which rotates with the respective rotor, and to which driven objects, such as aero foil blades, etc. can be affixed. The motor carrier member can be directly mounted to an object to be propelled by the coaxial direct drive system, or can be hollow to receive a support mast which is mounted to the object to be driven. The driven objects can have different rotational senses, such that when the prime movers counter rotate, the driven objects generate trust in the same direction.

9 Claims, 2 Drawing Sheets

(51) Int. Cl.
    *B64D 27/24*     (2006.01)
    *B64D 35/06*     (2006.01)
    *B63H 1/14*     (2006.01)
    *H02K 16/00*     (2006.01)

(56) References Cited

U.S. PATENT DOCUMENTS

| | | | |
|---|---|---|---|
| 5,990,590 A * | 11/1999 | Roesel, Jr. | F02N 11/04 310/112 |
| 2003/0213460 A1* | 11/2003 | Schwam | B64D 27/02 123/242 |
| 2005/0098143 A1* | 5/2005 | Schwam | B64D 27/02 123/242 |
| 2006/0033392 A1* | 2/2006 | Ritchey | H02K 7/108 310/112 |
| 2006/0033393 A1* | 2/2006 | Ritchey | H02K 7/108 310/112 |
| 2007/0296281 A1* | 12/2007 | Choi | B29C 45/5008 310/12.14 |
| 2008/0284256 A1* | 11/2008 | Budde | B29C 45/5008 310/12.14 |
| 2009/0026310 A1* | 1/2009 | Linn | B64C 11/306 244/65 |
| 2009/0159740 A1* | 6/2009 | Brody | B64C 27/10 244/17.21 |
| 2010/0059944 A1* | 3/2010 | Oteman | B60G 13/001 280/6.157 |
| 2010/0206649 A1* | 8/2010 | Ishii | B60K 6/26 180/65.31 |
| 2010/0206982 A1* | 8/2010 | Moore | B64C 11/48 244/62 |
| 2010/0219706 A1* | 9/2010 | Watanabe | B60K 6/26 310/107 |

* cited by examiner

COAXIAL DIRECT DRIVE SYSTEM HAVING AT LEAST TWO PRIMER MOVERS LINEARLY MOVEABLE ALONG A DRIVE SUPPORT MEMBER

FIELD OF THE INVENTION

The present invention relates to a coaxial direct drive system. More specifically, the present invention relates to a coaxial direct drive system having at least two prime movers arranged coaxially along an axis.

BACKGROUND OF THE INVENTION

Coaxial drive systems are well known and are commonly employed where it is desired to reduce undesired gyroscopic or rotational moment forces acting on the driven vehicle or device. For example, underwater vessels such as torpedoes and submarines often employ counter-rotating coaxially arranged propellers so that the tendency for the vessel to rotate with respect to a fixed propeller, rather than the propeller rotating with respect to the fixed vessel, is reduced. Similarly, some airplanes employ counter-rotating propellor systems to reduce the effects of propellor torque.

However, in all known coaxial drive systems, one drive is achieved via a first drive shaft which is hollow (which connects a prime mover to the first driven member, such as a propeller) and the other drive is achieved by a second drive shaft, located within the hollow first drive shaft, which connects a prime mover to the second driven member.

While such systems have been employed for many years, they suffer from disadvantages in that the required hollow drive shaft tends to be large and expensive to fabricate, the weight and/or mass of the drive shafts tends to be large and the configuration and arrangement of the overall coaxial system tends to be constrained by the requirements for the nested drive shafts.

Advanced helicopter designs have employed counter-rotating, coaxial rotor systems to reduce or eliminate the need for a tail rotor and/or to reduce helicopter operating noise. In flight-related coaxial designs, such as those employed for helicopters, the weight of the nested drive shafts and the mechanical complexities of mounting such systems and operably connecting them to respective prime mover systems has resulted in expensive and/or complex systems which can be fragile and/or difficult to service and/or maintain.

More recently, small helicopter systems, such as radio controlled or autonomous drones have employed coaxial drive systems wherein the prime movers are electric motors. However, such systems still suffer from the disadvantages of requiring coaxially arranged drive shafts to which the helicopter rotors can be attached. Such systems also require appropriate transmissions and/or complex linkages to transfer the torque produced by the electric motors to the drive shafts and then to the rotors and such transmissions and linkages increase cost, weight and complexity, which can reduce the reliability of such systems.

SUMMARY OF THE INVENTION

It is an object of the present invention to provide a novel coaxial direct drive system which obviates or mitigates at least one disadvantage of the prior art.

According to a first aspect of the present invention, there is provided a coaxial direct drive system comprising: at least first and second prime movers, each of said at least first and second prime movers respectively comprising an electrical stator and rotor; each stator affixed to a motor carrier member to define a common axis of rotation; each rotor encircling a respective stator and rotating about the common axis; and at least first and second driven members, a respective one of each of said at least first and second driven members affixed to a respective rotor, such that when the corresponding prime mover is energized and operating, the respective driven member is rotated about the common axis.

Preferably, the first and second prime movers are energized to rotate in opposite directions. Preferably, the motor carrier member can move linearly along a support member.

According to another aspect of the present invention, there is provided a coaxial direct drive system comprising: a first prime mover including a stator and a rotor; a second prime mover including a stator and a rotor; and a motor carrier member, to which the stators of the first and second prime movers are affixed, the stators being affixed such that the respective rotors rotate about a common axis and wherein each rotor is directly connected to a respective device to be driven.

The present invention provides a coaxial direct drive system which includes at least two prime movers mounted to a motor carrier member. Each prime mover includes a stator affixed to the motor carrier member, and each prime mover further includes arotor which can rotate about a common axis with the rotor of each other prime mover. Each rotor has a driven member affixed to it, which rotates with the respective rotor, and to which driven objects, such as aero foil blades, etc. can be affixed. The motor carrier member can be directly mounted to an object to be propelled by the coaxial direct drive, or can be hollow to receive a support mast which is mounted to the object to be driven.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
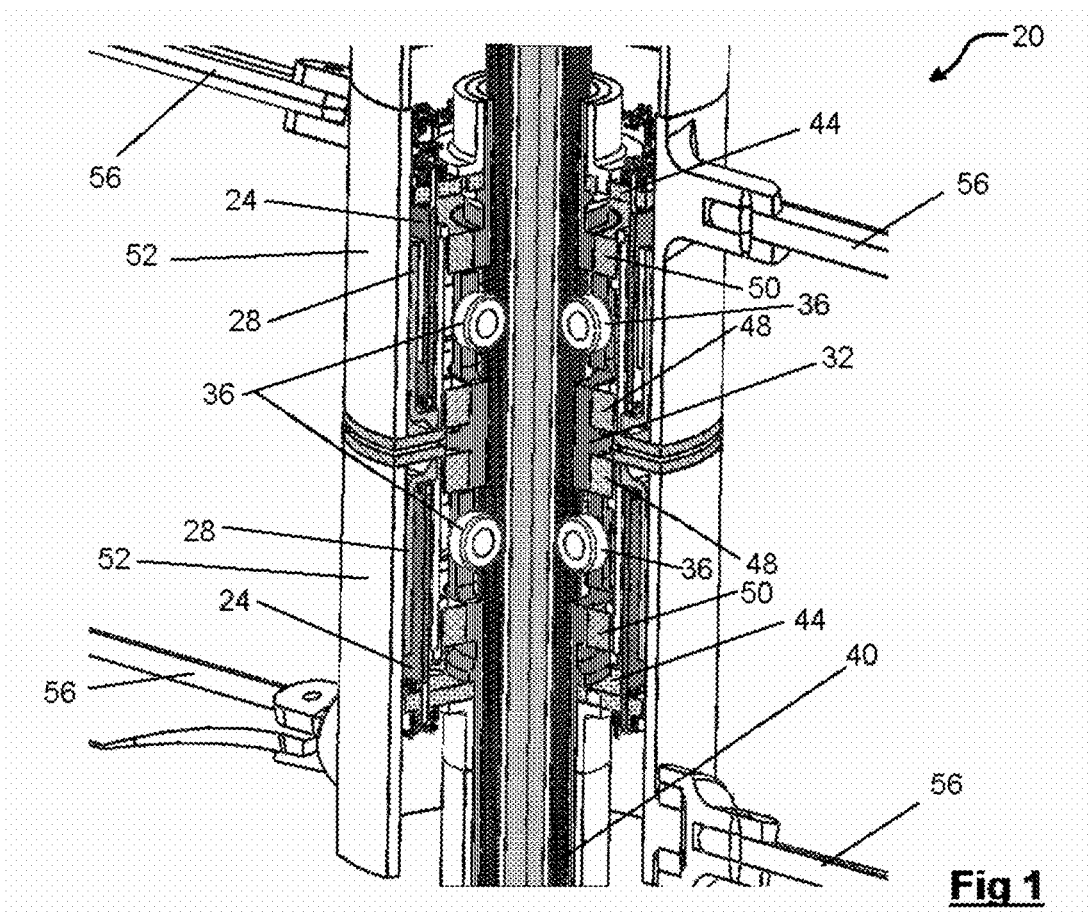
FIG. 1 is a side perspective, partial cut-away view of a coaxial direct drive system in accordance with the present invention.
Figure 2:
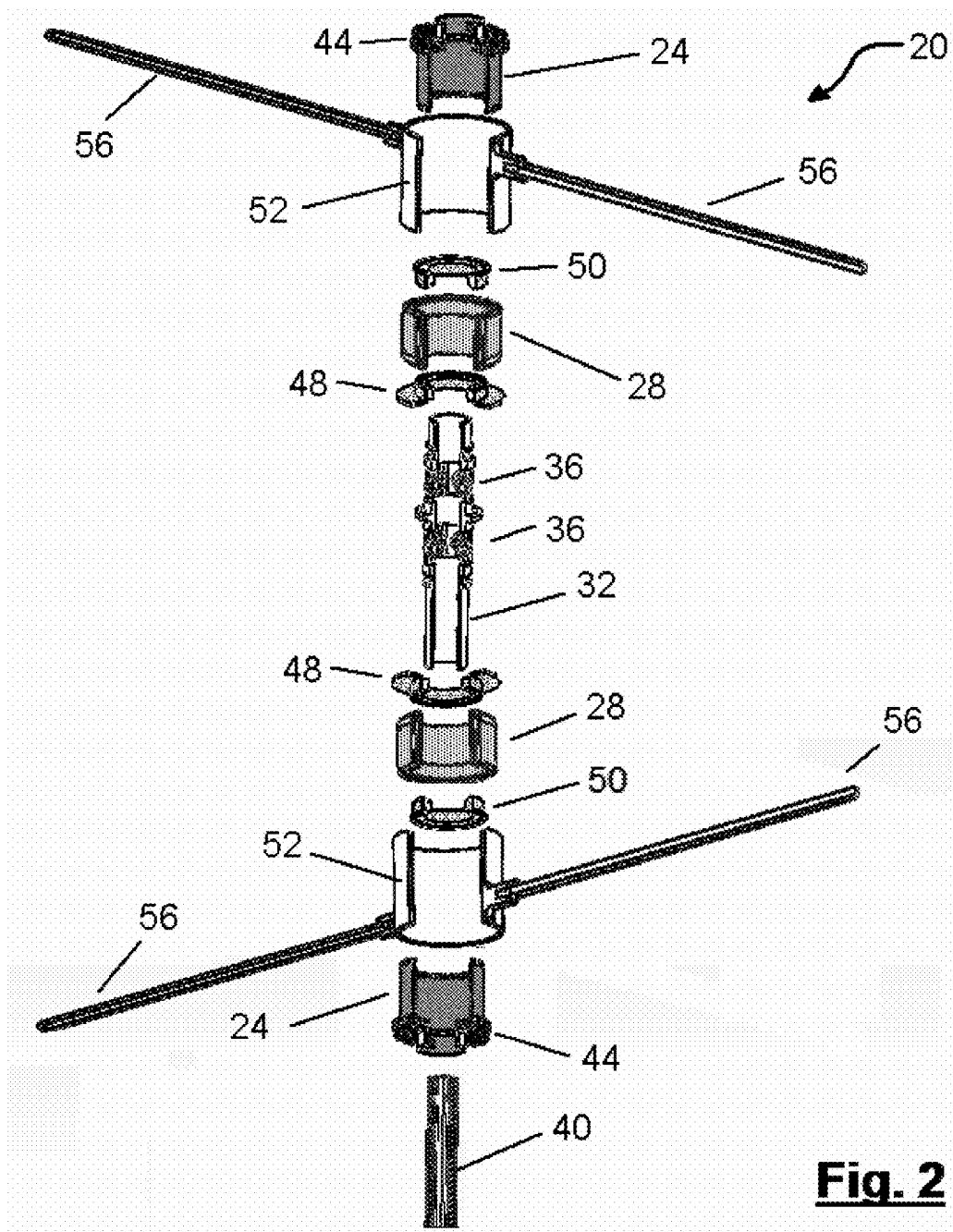
FIG. 2 shows an exploded view of the drive system of FIG. 1.

A coaxial direct drive system in accordance with the present invention is indicated generally at 20 in FIGS. 1 and 2. Drive system 20 includes at least two prime movers, and in the illustrated example, these prime movers are electric motors, each comprising an annular stator 24 and an annular rotor 28.

In a presently preferred embodiment, the particular electric motors are brushless DC ring motors, such as the model TG2320 Brushless Motor, commercially available from ThinGap, 2064 Eastman Avenue, Ventura Calif., USA. However, as will be apparent to those of skill in the art, the present invention is not limited to use with these particular electric motors and any other suitable electric annular-design motors can be employed, including commutated (brushed) DC motors, or variable speed AC motors, etc.

While not shown in FIGS. 1 and 2, stators 24 are electrically connected to a suitable power supply, and stators 24 are mounted to a motor carrier member 32. In the illustrated embodiment, motor carrier member 32 is hollow, allowing it to move, via bearings 36, along a drive support mast 40 which, typically, will be affixed to the object being driven. Preferably, support mast 40 is index-shaped, such as by having a cruciform or other non-round cross-section, and bearings 36 engage and interact with the shape, to prevent motor carrier member 32 from rotating with respect to support mast 40 while allowing motor carrier member 32 to move along the length of support mast 40.

Support mast 40 can include a pair of spaced stops (not illustrated) to limit the length of support mast 40 along which motor carrier member 32 can travel. For example, if drive system 20 is employed to generate lift and support mast 40 is mounted vertically to the object to be lifted, as direct system 20 creates lift, motor carrier member 32 will ascend support mast 40 until motor carrier member 32 abuts an upper stop, after which the generated lift will act upon the object to which drive system 20 is mounted. If the lift created by drive system 20 is terminated, reduced or reversed, motor carrier member 32 will descend support mast 40 until it abuts a lower stop. While the illustrated embodiment includes a support mast 40 to be affixed to the driven object, this is merely one possible configuration of the present invention. It is contemplated that, depending upon the desired use of coaxial direct drive system 20, support mast 40 can be omitted and motor carrier member 32 can be mounted to the object to be driven. Further, it is contemplated that motor carrier member 32 need not be hollow, nor is it limited to any particular shape or configuration beyond the necessity that the electric motor prime movers can be affixed to it in a coaxial arrangement whereby rotors 28 can be driven about a common axis, as required.

Returning now to the embodiment of FIGS. 1 and 2, stators 24 are affixed to motor carrier member 32 by stator mounts 44. Rotors 28 are rotatably mounted, via bearings 48 and 50, to stators 24. When an electromotive force is created between rotors 28 and stators 24, when stators 24 are energized, a torque is created between rotors 28 and stators 24 such that rotors 28 rotate about stators 24 and motor carrier member 32.

In the illustrated embodiment, where the prime movers are brushless DC motors, rotors 28 employ permanent magnets, thus avoiding the requirement for brushes, slip rings, commutators or other means for providing electrical connections to rotors 28, thus simplifying drive system 20. However, it should be apparent to those of skill in the art that in other embodiments rotors 28 can employ electromagnets, which can be powered by any suitable means, such as by the above-mentioned brushes, slip rings, commutator, etc. As has also been previously mentioned, the prime movers can be variable speed AC motors, etc.

Returning now to FIGS. 1 and 2, a driven member 52, is affixed to each rotor 28 and rotates with it when the corresponding stator 24 is energized. In the embodiment of FIGS. 1 and 2, the driven members 52 are blade carriers to which aero foil blades 56 (such as helicopter rotor blades) are affixed.

In the illustrated embodiment, which is intended for use with helicopters or the like, one stator 24 is energized in the opposite sense from the other stator 24 such that their respective driven rotors 28 rotate in the opposite sense from each other, thus forming a counter-rotating coaxial direct drive system. In such a case, as will be apparent to those of skill in the art, the aero foil blades 56 affixed to one driven member 52 are fabricated with an opposite sense to the aero foil blades affixed to the other driven member 52, such that each set of aero foil blades 56 produces thrust in the same direction as the other set of aero foil blades 56, despite being rotated in opposite directions during normal operation.

As should be apparent to those of skill in the art, the present invention is not intended to be limited to use with aero foil blades and a wide variety of other devices and systems can be connected to, and driven by, driven members 52 as desired. For example, propellor blades for use in water or other liquids can be employed if desired.

While the illustrated embodiment shows a coaxial direct drive system with two prime movers (in this example the electric motors) it is also contemplated that the present invention can be employed with more than two prime movers, if desired. For example, a coaxial direct drive system in accordance with the present invention can be constructed with four prime movers affixed to motor carrier member 32, driving four driven members 52. In such a case, it is contemplated that it will be preferred to alternate the rotational direction of the prime movers such that adjacent prime movers rotate in opposite senses, e.g.—the bottom prime mover rotating clockwise, the prime mover above it rotating counter-clockwise, the prime mover above that rotating clockwise, and the top most prime mover rotating counter-clockwise. It is also contemplated that pairs of prime movers may be spaced from each other on motor carrier member 32 and/or that each pair of prime movers can be mounted to a respective one motor carrier member 32 and the two (or more) motor carrier members 32 can be interconnected in a spaced manner by appropriate linking members (not shown).

It is also contemplated that the coaxial direct drive system of the present invention need not have even numbers of prime movers. For example a coaxial direct drive system in accordance with the present invention can include three prime movers. In such a case, if it is desired to produce a rotationally balanced system, one of the prime movers can be sized and arranged to produce twice the thrust of each of the other two prime movers in the system. Such a system may be employed, for example, with the higher thrust prime mover located between the two lower thrust prime movers to alter the acoustic noise pattern of the coaxial direct drive.

Similarly, a third prime mover can be included as a redundant feature, in case of failure of the first prime mover or the second prime mover. In such a case, it is contemplated that upon detection of a failure of the first or second prime mover, the third prime mover can be energized as a substitute for the failed first or second prime mover. The third primer mover will be energized to rotate in the same sense as the failed prime mover to maintain the stability of drive system 20 and, where aero foil baldes 56 are connected to drive member 52, it is contemplated that adjustable pitch and/or self-feathering aero foil blades can be employed such that the redundant prime mover can generate thrust in the desired direction whether operated in a clockwise, or counter-clockwise sense.

As should now be apparent, the present invention provides a coaxial direct drive system which includes at least two prime movers mounted to a motor carrier member, the at least two prime movers rotating about a common axis. Each prime mover includes a stator affixed to the motor carrier member to define a common axis, and each prime mover further including a rotor which can rotate about the common axis. Each rotor has a driven member affixed to it, which rotates with the respective rotor, and to which driven objects, such as aero foil blades, etc. can be affixed. The motor carrier member can be directly mounted to an object to be propelled by the coaxial direct drive, or can be hollow to receive a support mast or other component which is mounted to the object to be driven and the motor carrier member can move along the support mast or other component within a permitted range of movement.

The above-described embodiments of the invention are intended to be examples of the present invention and alterations and modifications may be effected thereto, by those of skill in the art, without departing from the scope of the invention which is defined solely by the claims appended hereto.

I claim:

1. A coaxial direct drive system comprising:
   a drive support mast affixed to and extending away from a vehicle body;
   at least first and second prime movers, each of said at least first and second prime movers respectively comprising an electrical stator and rotor and each rotor encircling a respective stator;
   a motor carrier member encircling the drive support mast and slidable along the drive support mast relative to the vehicle body;
   each stator affixed to the motor carrier member to define a common axis of rotation for the rotors; each affixed stator and respective rotor being moveable linearly along the drive support mast via sliding of the motor carrier member along the drive support mast; the motor carrier member and stators being prevented from rotating about the drive support mast; and
   at least first and second driven members, a respective one of each of said at least first and second driven members affixed to a respective rotor, such that when the corresponding prime mover is energized and operating, the respective driven member is rotated about the common axis relative to the vehicle body.

2. The coaxial direct drive system of claim 1 wherein the motor carrier member is hollow.

3. The coaxial direct drive system of claim 1 wherein the prime movers are brushless DC ring motors.

4. The coaxial direct drive system of claim 1 wherein the motor carrier member further includes at least two bearings which engage the drive support member to facilitate movement of the motor carrier along the drive support member.

5. The coaxial direct drive system of claim 1 wherein the first and second prime movers are energized to rotate in opposite directions.

6. The coaxial direct drive system of claim 5 wherein each driven member includes at least one aero foil blade mounted thereto and wherein each of the at least one aero foil blades mounted to the first driven member have an opposite sense to that of each of the at least one aero foil blades mounted to the second driven member.

7. The coaxial direct drive system of claim 1, wherein the vehicle is an aircraft, and wherein each driven member includes at least one aero foil blade mounted thereto.

8. The coaxial direct drive system of claim 7 wherein the motor carrier member is configured to slide along the drive support mast responsive to lift generated by the at least one aero foil blade.

9. The coaxial direct drive system of claim 8, further comprising:
   an upper stop at an end of the drive support mast, the motor carrier member configured to cease sliding along the drive support mast upon abutting the upper stop.

* * * * *